(12) United States Patent
Schuster et al.

(10) Patent No.: US 7,804,262 B2
(45) Date of Patent: Sep. 28, 2010

(54) NON-INTRUSIVE ELECTRONIC CONTROL CIRCUITRY TO DETECT AN OPEN PROTECTOR IN A HERMETICALLY SEALED COMPRESSOR

(75) Inventors: Don A. Schuster, Lindale, TX (US); Zane Prince, Tyler, TX (US)

(73) Assignee: Carrier Corporation, Farmington, CT (US)

( * ) Notice: Subject to any disclaimer, the term of this patent is extended or adjusted under 35 U.S.C. 154(b) by 12 days.

(21) Appl. No.: 12/299,695

(22) PCT Filed: May 15, 2006

(86) PCT No.: PCT/US2006/018557
§ 371 (c)(1), (2), (4) Date: Nov. 5, 2008

(87) PCT Pub. No.: WO2007/136362
PCT Pub. Date: Nov. 29, 2007

(65) Prior Publication Data
US 2009/0180220 A1 Jul. 16, 2009

(51) Int. Cl.
*H02P 1/00* (2006.01)
(52) U.S. Cl. .................. 318/283; 318/260; 318/560
(58) Field of Classification Search .......... 318/283, 318/268, 560, 781, 785, 772; 307/116; 361/25
See application file for complete search history.

(56) References Cited

U.S. PATENT DOCUMENTS

| 6,758,050 B2 | 7/2004 | Jayanth et al. |
| 2005/0224035 A1 * | 10/2005 | Burke et al. ............ 123/179.3 |
| 2006/0016200 A1 | 1/2006 | Jayanth et al. |

* cited by examiner

*Primary Examiner*—Karen Masih
(74) *Attorney, Agent, or Firm*—Marjama Muldoon Blasiak & Sullivan LLP

(57) ABSTRACT

An electronic apparatus externally detects open protector contacts inside of a compressor. The compressor includes a compressor motor having a run winding and a start winding. The compressor motor also includes internal protector contacts that open the electrical circuit to the "C" terminal in a protection condition. A compressor running indicator circuit is electrically connected between the "S" and the "R" terminals to indicate a compressor running condition. Also, a protection indicator circuit is electrically connected between the "C" and the "S" terminals to indicate a voltage present across the "C" and the "S" terminals. The protection indicator circuit is also coupled to the compressor running indicator circuit such that the protection indicator circuit is disabled when the compressor is running normally and the protection indicator is enabled and indicates when protector contacts open inside of the compressor.

20 Claims, 3 Drawing Sheets

NON-INTRUSIVE ELECTRONIC CONTROL CIRCUITRY TO DETECT AN OPEN PROTECTOR IN A HERMETICALLY SEALED COMPRESSOR

FIELD OF THE INVENTION

This invention relates generally to compressor fault status indication and more particularly to a method and apparatus to determine the state of protection contacts in a sealed compressor.

BACKGROUND OF THE INVENTION

A compressor is an important component of a heating, ventilation, and air conditioning (HVAC) system. In most residential HVAC installations, the compressor is the highest cost component. When an HVAC system fails to operate properly, a service technician is generally called to diagnose and repair the system. When the service technician finds an inoperative compressor, the technician must determine whether the problem is in the compressor, or elsewhere in the HVAC system, including whether the compressor has overheated and simply needs time to cool and reset itself because of some other system fault. Under pressure to make a quick diagnosis and repair, technicians finding an inoperative compressor often replace the compressor with a known "good" compressor, most typically a new one. Historically up to 40% of returned compressors turn out to be good, with no defect found. These incorrect diagnoses translate directly to increased HVAC down time, wasted repair time, labor, and unnecessary labor and parts costs.

Most hermetically sealed compressors include internal protection switch contacts that open the internal compressor motor electrical circuit following a overheat condition as can be caused by a high mechanical load, an anomalously high line voltage, or by excessive compressor cycling. Once the abnormal condition that caused the overheat condition is cleared, most systems recover automatically after the compressor cools to a sufficiently low temperature where the protection contacts close.

Unfortunately, there is no immediate way for a servicing technician to determine if the internal protection contacts of the compressor are closed or momentarily open due to a non-catastrophic overload. The problem is that there is no convenient and more "fool-proof" method for a service technician to determine the state of the protection contacts inside of a sealed compressor at the external compressor electrical circuit terminals. Therefore, what is needed is a non-intrusive electronic control to inform the technician of the open or closed state of the protection contacts.

SUMMARY OF THE INVENTION

An electronic apparatus externally detects open protector contacts inside of a compressor. The compressor includes a compressor motor having a run winding and a start winding. The run winding and the start winding each have a first and a second winding connection. The first connection of both the start winding and the run winding are electrically connected together and to a common terminal ("C"). The second connection of the start winding is electrically connected to a start winding terminal ("S") and the second connection of the run winding is electrically connected to a run winding terminal ("R"). The compressor motor also includes internal protector contacts that open the electrical circuit to the "C" terminal in a protection condition. A contactor switches power to the compressor motor, the contactor electrically connected to a source of power and to the compressor motor. A capacitor is electrically connected between the source of power and the start winding or the run winding of the compressor motor. And, a compressor running indicator circuit is electrically connected between the "S" and the "R" terminals to indicate a compressor running condition. Also, a protection indicator circuit is electrically connected between the "C" and the "S" terminals to indicate a voltage present across the "C" and the "S" terminals. The protection indicator circuit is also coupled to the compressor running indicator circuit such that the protection indicator circuit is disabled when the compressor is running normally and the protection indicator is enabled and indicates when protector contacts open inside of the compressor.

BRIEF DESCRIPTION OF THE DRAWINGS

For a further understanding of these and objects of the invention, reference will be made to the following detailed description of the invention which is to be read in connection with the accompanying drawing, where.

DETAILED DESCRIPTION OF THE INVENTION

Figure 1:
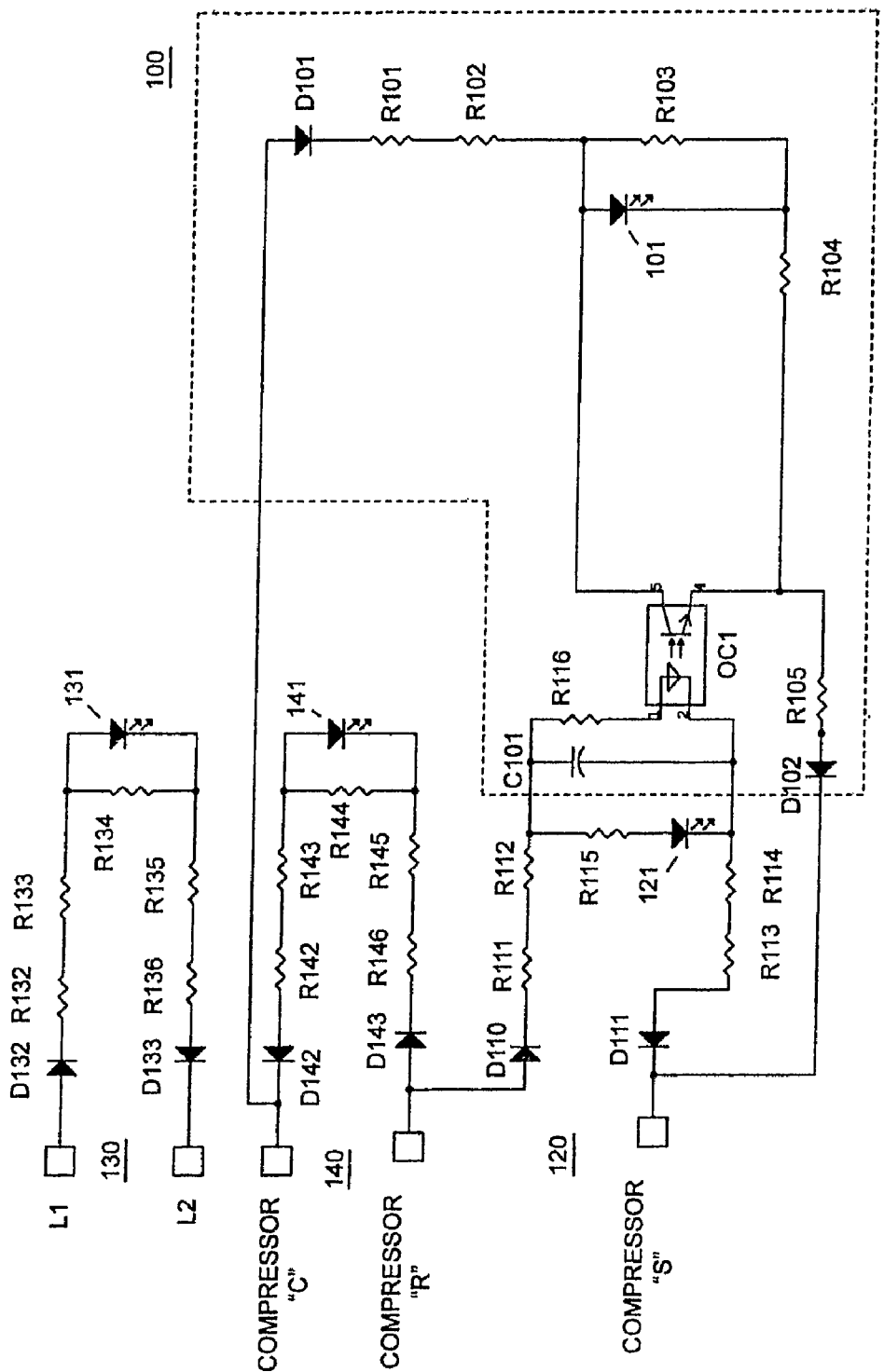
FIG. 1 shows a schematic diagram of a preferred embodiment of a compressor protection contact state indicator circuit according to the invention.

A preferred embodiment of a non-intrusive electronic control according to the invention to indicate the state of the protection contacts (open or closed) of a HVAC compressor is shown in FIG. 1. The inventive circuit is connected to three terminals: a compressor common terminal "C", a compressor run terminal "R", and a compressor start terminal "S". In operation, line power (safety) indicator light "Line Voltage Indication" 131 illuminates when line voltage L1-L2 (typically 208 to 240 VAC) is connected to the compressor controls. The optional line voltage indication light emitting diode (LED) circuit 130, connected between line voltage terminals L1 and L2, provides enhanced diagnostics by indicating the presence of line voltage, but is not required by the inventive circuit.

Figure 2:
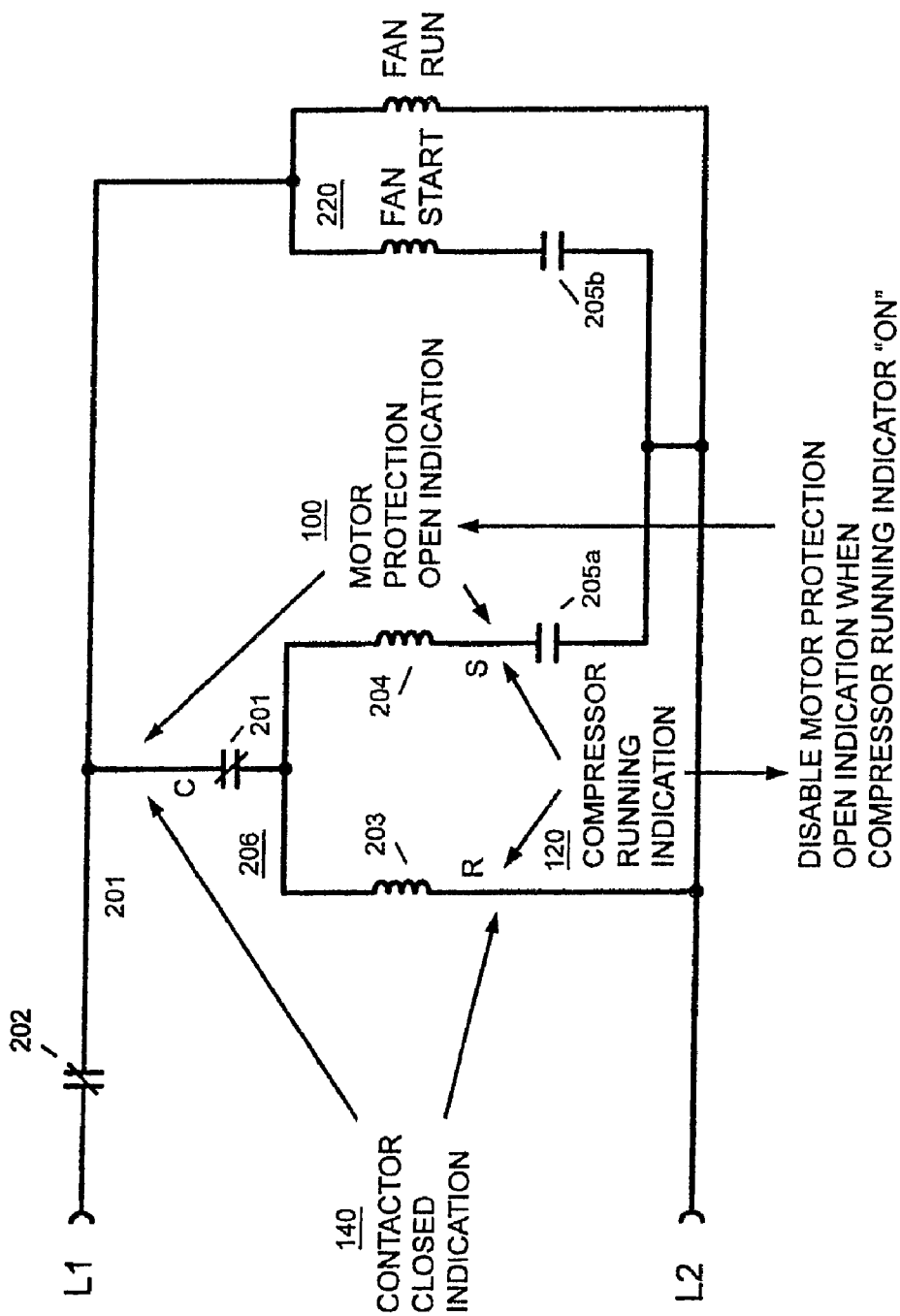
FIG. 2 shows an exemplary circuit diagram of a compressor motor.

We now turn to FIG. 2 to explain the operation of the non-intrusive electronic control indication shown in FIG. 1. As can be seen in FIG. 2, the "contactor closed control indication" 140 is connected across terminals "C" and "R". When the power contactor is closed (HVAC control calling for compressor operation), line voltage appears across terminals "C" and "R", illuminating the contactor closed indication LED 141. Note that the contactor closed illumination is helpful in the diagnosis process, but is not required by the inventive circuit. A service technician skilled in the art will realize that there must be power present following power contactor 202 for the compressor motor to run. The condition of line voltage at the compressor motor circuit, as typically supplied by a compressor contactor 202, is a prerequisite to effective use of the inventive method of protector contact state diagnosis.

The non-invasive (external) protector contact indication operates as follows. An indicator lamp based on half wave rectified current illumination of an LED indictor light can show when there is an AC voltage present between the compressor motor 206 "S" and "C" terminals. This voltage is present whether the compressor is running normally or the internal protection contacts are open due to a fault condition. It was realized, however, that by disabling the indicator based on the "S" "C" terminal potential (voltage) when there is an "R" "S" potential caused by normal compressor motor 206 operation, the result is an advantageous indication of the state of the otherwise inaccessible internal compressor motor protection contacts 201.

Note that the protector open LED indicator is dependant on the electrical windings in the compressor being intact. This is because when the internal compressor motor protection contacts 201 are open, the motor protection open indication circuit with its rectifier diodes, completes the indicator circuit through start winding 204 and run winding 203 to the L2 line connection. Therefore, if either start winding 204 or run winding 203 is failed "open", the protector open LED indicator will not illuminate. Thus, where all other indications and wiring infer that a compressor should be running, but the compressor fails to operate, and the protector open LED indicator is not illuminated, the technician can further diagnose a failed compressor winding.

The operation of the non-invasive protector contact control indication is now explained in more detail. It is understood that both system line voltage is present (as optionally indicated by the "Line Voltage Indication" LED 131) and that line voltage has been applied to the compressor motor 206, such as by a compressor contactor 202, as optionally indicated by the "Contactor Closed Indication" LED 141. Compressor 206 typically comprises a start winding 203, and run winding 204, and protection contacts 201. In normal operation, protection contacts 201 are closed, applying power (line current caused by the line voltage between L1 and L2) to compressor motor 206 run winding 203 and start winding 204 via series capacitor 205a. It will be understood by those skilled in the art, that compressor motor 206 can be a motor of a type where shaft rotation is cause by the phase difference in the voltage appearing across the run winding 203 and start winding 204 caused by a capacitor such as capacitor 205a connected in series with one of the windings, most typically the start winding, as shown in FIG. 2.

Returning to FIG. 1, the compressor running indicator section of the inventive circuit that detects and indicates by the "Hermetic Compressor Running Indication" LED 121, normal compressor powered operation comprises diode D110 connected to the compressor "R" terminal, a series resistance, such as the exemplary combination of resistors R111 and R112, a series resistor R115 to limit the current to LED 121 and to cause a voltage drop across the combination of R115 and LED 121 (to power opto-coupler OC1), a series resistance, such as the exemplary combination of resistors R113 and R114, and diode D111 coupled to the compressor "S" terminal. Circuit section 120 functions as a half wave rectifier to rectify and current limit the operating current of LED 121, where LED 121 illuminates to indicate line voltage across the "C" and "R" terminals of the compressor motor, the "Hermetic Compressor Running Indication". Circuit section 120, by virtue of the voltage drop across the series combination of R115 and LED 121, also provides a half wave rectified DC voltage, filtered by capacitor C101, across the series circuit of resistor R116 and the internal LED of opto-coupler OC1, causing the LED of opto-coupler OC1 to illuminate and to cause the opto-coupler OC1 output transistor to turn on (OC1, pins 4 and 5 conduct). In this way, OC1 can convey a Hermetic Compressor Running "ON" Indication to the "Hermetic Compressor Motor Protection Open Indication" section of the circuit 100.

Before proceeding to the "Hermetic Compressor Motor Protection Open Indication" section of the circuit 100, note that the connection and opto-coupler functions as described are symbolically represented on the schematic diagram of FIG. 2. The "Compressor Running Indication" section of the circuit 120 is symbolically shown as connected between compressor terminals "R" and "S". The opto-coupler is symbolically shown as conveying a Compressor Running "ON" Indication (opto-coupler OC1 terminals 4 and 5 can conduct) as will now be explained, to disable the "Hermetic Compressor Motor Protection Open Indication" 100 section of the circuit as shown symbolically as connected between the compressor motor "C" and "S" terminals.

Returning to the "Hermetic Compressor Motor Protection Open Indication" (protection indicator) section 100 of the schematic diagram of FIG. 1, the anode of diode D101 is connected to the motor compressor "C" terminal. The path from diode D101 through a series resistance, such as the exemplary combination of resistors R101 and R102, the parallel combination of resistor R103 and LED 101, the series resistors R104, and R105 and D102 to the "S" terminal of the compressor motor form another half wave rectifier circuit to light lamp LED 101 when power is applied to the compressor motor and the output transistor of opto-coupler OC1 is "OFF". All of the diodes shown in the circuit can be any type of diode suitably rated for use as rectifiers. When the internal LED of OC1 is lit and the output transistor of OC1 is "ON", the "Hermetic Compressor Motor Protection Open Indication" is disabled. Disabling occurs because the output voltage drop across the output terminals of the opto-coupler OC-1 is less than the minimum operating voltage drop to forward bias LED 101. That is, the current that would have otherwise illuminated LED 101 when the output transistor of OC-1 is an "OFF" state, now is diverted from lighting LED 101 by the OC-1 output transistor in the "ON" state, thus disabling LED 101 so long as OC-1 is "ON". One skilled in the art, can appreciate that while a single "ON" or "OFF" "Compressor Running Indication" is insufficient to positively indicate a protection contact failure, in combination with the "Compressor Running Indication" disable, a voltage monitor across the compressor "C" and "S" terminals can yield a very advantageous and definitive "Hermetic Compressor Motor Protection Open Indication".

As has been noted, the disable function in the exemplary circuit can be provided by an opto-coupler OC1, such as part number 4N27, a 6-pin package phototransistor output opto-coupler, manufactured by the Fairchild Semiconductor Corporation of South Portland, Me. Other suitable opto-couplers can be used as well. Any suitable coupler technology can also be used. While somewhat less desirable, a relay can also be used to provide the disable function.

It should also be noted that resistors have maximum voltage ratings, beyond which there can be an arc-over due to excessive voltage across them. Also, as is well known, resistors are rated for power dissipation. It can therefore be desirable for these or other reasons, to use series combinations of resistors to achieve a desired circuit resistance value. This is the case, for example, for the series combination of resistors R111 and R112. It is noted however, that a suitable valued resistor in ohms, watts, and voltage can be substituted for the series combination with no change in circuit performance. Such a substitution is unimportant to the invention.

Similarly, it is noted that the values of the components given in FIG. 1 represent only a preferred embodiment of the invention suitable for use in a 208 VAC single phase system. Other valued components (especially resistors) can be used for other voltages to provide suitable forward biasing illumination current for the LED indicators. Capacitor C101 need only be of suitable voltage rating, type, and capacitance to give a steady "ON" indication by the internal LED of optocoupler OC1 and is not limited to the exemplary value specified in a preferred embodiment as shown in FIG. 1.

Figure 3:
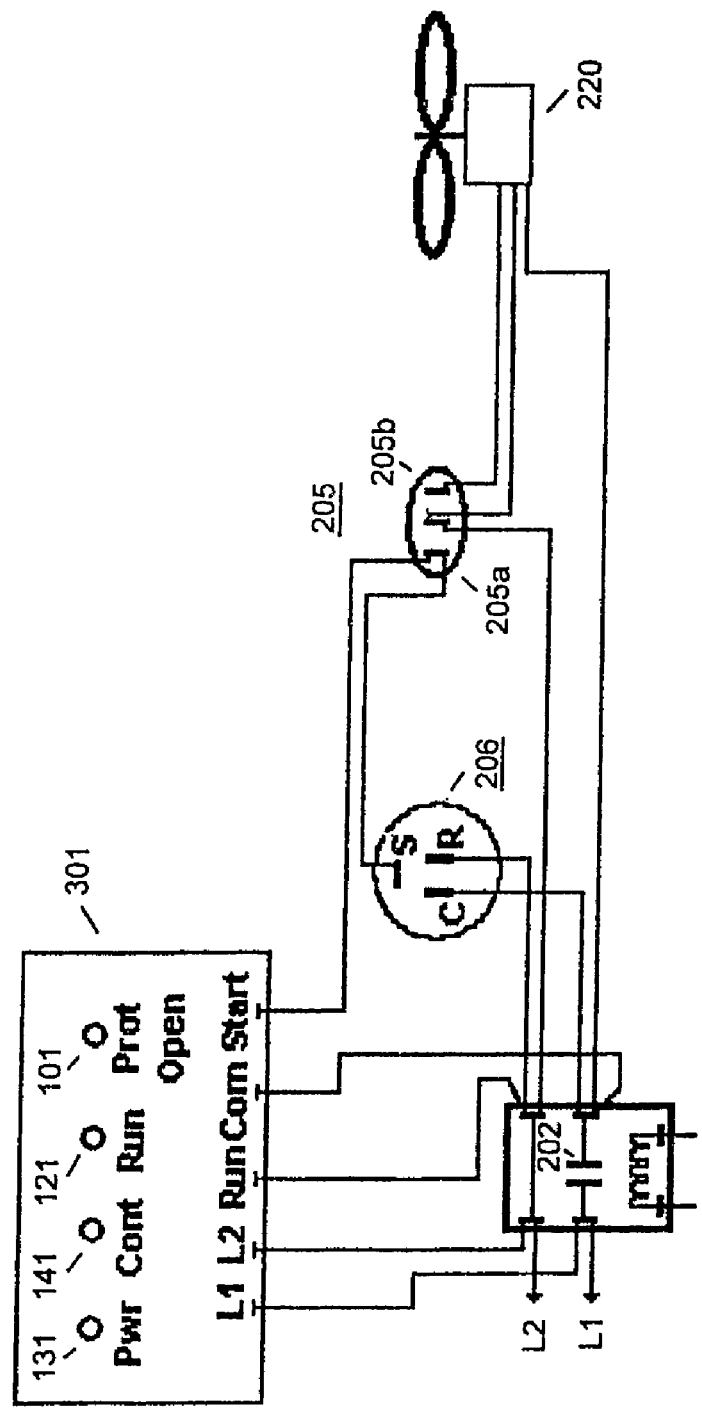
FIG. 3 shows an exemplary block diagram of a control board having a protection contact indicator connected to a compressor and ancillary components.

Also, it should be noted that since the connections to the compressor motor are all external to the compressor, all of the circuitry of FIG. 1 (or an equivalent embodiment carrying out the inventive detection method) can be located on an HVAC control printed circuit board (PCB). Special connections or terminals are not required for the inventive indication circuitry because all of the connection points are electrical nodes typically connected to a PCB to control the normal operation of the compressor. FIG. 3 shows an exemplary control board 301 including the inventive circuitry according to the invention. Note that only the conventional connections of input power (L1, L2) and compressor motor connections "C,", "R", and "S" are needed to achieve the inventive "Hermetic Compressor Motor Protection Open Indication".

Example 1

A preferred embodiment was tested using the exemplary control board of FIG. 1 with a Carrier Corporation model number 48GX-060130-311, single-phase, packaged cooling system with a Copeland model ZR57K3-PFV compressor.

The following exemplary component values were used in the circuit of FIG. 1:

R132, R133, R135, R136, R142, R143, R145, R146, R101, R105: 15 kilo ohms

R134, R144, R103, R116, R115: 1 kilo ohms

R111, R112, R114, R113: 10 kilo ohms

OC1: 4N27

C101: 47 µf

All diodes: 1N4007, 1A, 1,000 V, as manufactured by the On Semiconductor Corporation of Phoenix, Az.

LED: general purpose light emitting diodes

It should be emphasized that the above parts values are merely the values of parts used in a preferred embodiment of the inventive circuit and that it is not necessary to use these values to practice the invention. Moreover, one skilled in the art will note that variations of the circuit, such as using one suitably rated resistor to replace two series resistors is not important to the operation of the inventive circuit.

The internal motor protection contacts of the compressor were tripped open by short cycling the compressor. Short cycling can be done by operating the compressor motor for a period of time sufficient to build up a normal operating refrigerant pressure differential between the suction and discharge of the compressor. The compressor unit is then turned off for a short period of time so that only minimal pressure equalization occurs. Because of the short off period, when the compressor attempts to re-start, it can not start against the pressure differential, thus the internal protector contacts open due to the relatively high compressor motor load current. During this testing, before the trip condition the following indicator lamps (LEDs) were "ON": the optional "Line Voltage Indication", the optional "Contactor Closed Indication", and the "Compressor Running Indication"; the "Hermetic Compressor Motor Protection Open Indication" indicator lamp was observed to be "OFF". Following the trip of the compressor internal motor protection contacts as intentionally caused by short cycling the compressor, the following indicator lamps (LEDs) were "ON": the optional "Line Voltage Indication", the optional "Contactor Closed Indication", and the "Hermetic Compressor Motor Protection Open Indication"; the "Compressor Running Indication" indicator lamp was observed to be "OFF". This test demonstrated external detection of open protector switch contacts in a hermetically sealed compressor by use of the exemplary non-intrusive electronic control circuit shown in FIG. 1.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. An electronic apparatus to externally detect open protector contacts inside of a compressor comprising:
a compressor motor having a run winding and a start winding, the run winding and the start winding each having a first and a second winding connection, the first connection of both the start winding and the run winding electrically connected together and to a common terminal, the second connection of the start winding electrically connected to a start winding terminal, the second connection of the run winding electrically connected to a run winding terminal, the compressor motor also including internal protector contacts that open the electrical circuit to the common terminal in a protection condition;
a contactor to switch power to the compressor motor, the contactor electrically connected to a source of power and to the compressor motor;
a capacitor electrically connected between the source of power and the start winding or the run winding of the compressor motor;
a compressor running indicator circuit electrically connected between the start winding and the run winding terminal to indicate a compressor running condition; and
a protection indicator circuit electrically connected between the common terminal and the start winding terminal to indicate a voltage present across the common terminal and the start winding terminals,
wherein the protection indicator circuit is also coupled to the compressor running indicator circuit such that the protection indicator circuit is disabled when the compressor is running normally and a protection indicator is enabled and indicates when the protector contacts open inside of the compressor.

2. The electronic apparatus of claim 1 further comprising a line indicator to indicate the presence of the source of power.

3. The electronic apparatus of claim 1 further comprising a contactor indicator to indicate that line power has been supplied to the compressor motor.

4. The electronic apparatus of claim 1 wherein at least one of the indicators is a light.

5. The electronic apparatus of claim 4 wherein at least one of the light indicators is a light emitting diode.

6. The electronic apparatus of claim 1 wherein the protection indicator circuit is coupled to the compressor running indicator circuit by an opto-coupler.

7. The electronic apparatus of claim 1 wherein the protection indicator circuit is coupled to the compressor running indicator circuit by a relay.

8. The electronic apparatus of claim 1 wherein the protection indicator circuit indicates an open run winding or an open start winding when the protection indicator is not illuminated and all other indications infer that the compressor should be running.

9. The electronic apparatus of claim 1 wherein the compressor is a hermetically sealed compressor.

10. An electronic apparatus to externally detect open protector contacts inside of a compressor comprising:
   a compressor motor having a run winding and a start winding, the run winding and the start winding each having a first and a second winding connection, the first connection of both the start winding and the run winding electrically connected together and to a common terminal, the second connection of the start winding electrically connected to an start winding terminal, the second connection of the run winding electrically connected to an run winding terminal, the compressor motor also including internal protector contacts that open the electrical circuit to the common terminal in a protection condition;
   a contactor means for switching power to the compressor motor, the contactor means electrically connected to a source of power and to the compressor motor;
   a capacitor means for phase shifting current to the start winding, the start capacitor electrically connected between the source of power and the start winding or the run winding of the compressor motor;
   an compressor running indicator means for indicating that the compressor motor is operating, the compressor running indicator means electrically connected between the start winding and the run winding terminal to indicate a compressor running condition; and
   a protection indicator means for indicating open protector contacts, the protection indicator means electrically connected between the common and the start winding terminal to indicate a voltage present across the common and the start winding terminal,
   wherein the protection indicator means is also coupled to the compressor running indicator means such that the protection indicator means is disabled when the compressor is running normally and the protection indicator means is enabled and indicates when the protector contacts open inside of the compressor.

11. The electronic apparatus of claim 10 further comprising a line indicator means for indicating the presence of the source of power.

12. The electronic apparatus of claim 10 further comprising a contactor indicator means for indicating that line power has been supplied to the compressor motor.

13. The electronic apparatus of claim 10 wherein at least one of the indicators means includes a light.

14. The electronic apparatus of claim 13 wherein at least one of the light indicators includes a light emitting diode.

15. The electronic apparatus of claim 10 wherein the protection indicator means is coupled to the compressor running indicator means by an opto-coupler means for disabling the protection indicator means when the compressor motor is operating normally.

16. The electronic apparatus of claim 10 wherein the protection indicator means is coupled to the compressor running indicator means by a relay.

17. The electronic apparatus of claim 10 wherein the protection indicator means indicates an open run winding or an open start winding when the protection indicator means is not illuminated and all other indications infer that the compressor should be running.

18. The electronic apparatus of claim 10 wherein the compressor is a hermetically sealed compressor.

19. A method to externally detect open protector contacts inside of a compressor comprising the steps of:
   providing a compressor motor including internal protector contacts, the compressor motor having a common terminal, a start winding terminal, and run winding terminal;
   providing a compressor running indicator circuit to indicate a voltage across the start winding terminal and the run winding terminal;
   providing a protector indicator circuit, the protector indicator circuit to indicate a voltage across the common terminal and the start winding terminal of the compressor;
   disabling the protector indicator circuit when the compressor motor is operating normally; and
   indicating open internal compressor protector contacts when the internal compressor protector contacts are open and the compressor motor is not running.

20. The method of claim 19 comprising diagnosing an open start or run motor winding when the protection indicator is not illuminated and all other indications infer that the compressor should be running.

* * * * *